US009420413B2

United States Patent
Lin et al.

(10) Patent No.: US 9,420,413 B2
(45) Date of Patent: Aug. 16, 2016

(54) PUSH METHOD, SYSTEM AND SERVER BASED ON LOCATION INFORMATION

(71) Applicant: Beijing Baidu Netcom Science and Technology Co., Ltd., Beijing (CN)

(72) Inventors: Hua Lin, Beijing (CN); Jun Luo, Beijing (CN); Hongxian Du, Beijing (CN)

(73) Assignee: Beijing Baidu Netcom Science And Technology Co., Ltd., Beijing (CN)

( * ) Notice: Subject to any disclaimer, the term of this patent is extended or adjusted under 35 U.S.C. 154(b) by 0 days.

(21) Appl. No.: 14/411,901

(22) PCT Filed: Apr. 2, 2014

(86) PCT No.: PCT/CN2014/074654
§ 371 (c)(1),
(2) Date: Dec. 29, 2014

(87) PCT Pub. No.: WO2014/161490
PCT Pub. Date: Oct. 9, 2014

(65) Prior Publication Data
US 2015/0148076 A1 May 28, 2015

(30) Foreign Application Priority Data
Apr. 2, 2013 (CN) .......................... 2013 1 0113186

(51) Int. Cl.
*H04W 4/02* (2009.01)
*G06F 17/30* (2006.01)
*H04L 29/08* (2006.01)

(52) U.S. Cl.
CPC ............. *H04W 4/02* (2013.01); *G06F 17/3087* (2013.01); *H04L 67/26* (2013.01)

(58) Field of Classification Search
None
See application file for complete search history.

(56) References Cited

U.S. PATENT DOCUMENTS

| 2011/0090123 A1* | 4/2011 | Sridhara | G01S 5/0252 342/450 |
| 2013/0321402 A1* | 12/2013 | Moore | G01C 21/3664 345/419 |
| 2013/0325341 A1* | 12/2013 | van Os | G01C 21/3611 701/533 |
| 2013/0326380 A1* | 12/2013 | Lai | G06F 3/0481 715/765 |

FOREIGN PATENT DOCUMENTS

| CN | 102098620 A | 6/2011 |
| CN | 102291435 A | 12/2011 |
| CN | 102802116 A | 11/2012 |

OTHER PUBLICATIONS

International Search Report, PCT/CN2014/074654, Jul. 8, 2014.

* cited by examiner

*Primary Examiner* — Diane Mizrahi
(74) *Attorney, Agent, or Firm* — Orrick, Herrington & Sutcliffe, LLP (57) ABSTRACT

The present invention proposes a pushing method based on location information, comprising: recording a plurality of areas passed by a user; obtaining a resident area of the user according to the frequencies at which the user uses an electronic map in the plurality of areas, and pushing, when it is judged that the user enters a new area from the resident area, point of interest information in the new area to the user according to the point of interest information about the user in the resident area. The method in the embodiments of the present invention fully exploits the interests of a user and performs personalized customization, may better meet and inspire the needs of the user, and is widely applicable and easy to expand. The present invention also discloses a pushing system and server based on location information.

17 Claims, 2 Drawing Sheets

PUSH METHOD, SYSTEM AND SERVER BASED ON LOCATION INFORMATION

CROSS-REFERENCE TO RELATED APPLICATIONS

This application is a national stage filing of International Patent Application No. PCT/CN2014/074654, filed on Apr. 2, 2014, which claims priority to Chinese Patent Application No. CN201310113186.7, filed on Apr. 2, 2013, the contents of which are incorporated herein by reference in their entireties and for all purposes.

TECHNICAL FIELD

The present invention relates to the technical field of the Internet, and in particular to a pushing method, system and server based on location information.

BACKGROUND

With the development of the Internet, the interaction between a client and a server is deeper and wider. The server has slowly shifted from simply responding to a client request, and more and more servers have started to actively push information to clients. With the development of the mobile Internet in recent years, a large number of users use mobile terminals to interact with the server in real time. Applications such as maps provide location information to the server. According to the use of the user, the server may generally obtain information such as the user's location, query vocabulary and track.

The user may be interested in information about the surrounding area while querying the map, or often needs to know some basic information when entering a new area. If the user's hobby can be exploited according to the recorded information, or if corresponding content is pushed, according to the location, in combination with user setting information, it will facilitate the use of the user and will help the user to save time and effort. However, this information is not fully exploited and used in the prior art.

SUMMARY

The present invention is intended to at least solve one of the problems existing in the prior art.

For this purpose, an objective of the present invention is to propose a pushing method based on location information. This method fully exploits the interests of a user and performs personalized customization, may better meet and inspire the needs of the user, and is widely applicable and easy to expand.

A second objective of the present invention is to propose a pushing system based on location information.

A third objective of the present invention is to propose a server.

In order to achieve the above-mentioned objectives, a first aspect embodiment of the present invention proposes a pushing method based on location information, comprising: recording a plurality of areas passed by a user; obtaining a resident area of the user according to the frequencies at which the user uses an electronic map in the plurality of areas, and pushing, when it is judged that the user enters a new area from the resident area, point of interest information in the new area to the user according to the point of interest information about the user in the resident area.

The pushing method based on location information in the embodiments of the present invention judges a resident area of the user by recording areas passed by the user, and intelligently judges and pushes point of interest information to the user when the user enters a new area. The method may be applied to products such as maps, fully performs personalized customization with user needs as the core, fully exploits the interests of the user, better meets and inspires the needs of the user, changes the passive response mode of the traditional server, has strong interactivity, and is widely applicable and easy to expand.

In one embodiment of the present invention, obtaining a resident area of the user according to the frequencies at which the user uses an electronic map in the plurality of areas specifically comprises: obtaining relationship strength information about the user relative to the plurality of areas according to the frequencies at which the user uses the electronic map in the plurality of areas, and selecting the resident area of the user from the plurality of areas according to the relationship strength information.

In one embodiment of the present invention, the relationship strength information K is calculated by means of the following formula:

$$K = SEQ * Sn + Sum(TYPE * Tx) * Tn / Count(TYPE),$$

where SEQ represents a reference frequency, Sn represents a first weight value coefficient corresponding to the reference frequency, TYPE represents an operation type when the user uses the electronic map, Tx represents a second weight value coefficient corresponding to the operation type, Sum(TYPE*Tx) represents the sum of the products of all the operation types TYPE and the corresponding second weight value coefficients Tx, Tn represents a third weight value coefficient, and Count(TYPE) represents the total number of the operation types TYPE.

In one embodiment of the present invention, it further comprises: obtaining one or more of search information, subscription information and behavior information about the user, and pushing, to the user, the point of interest information in the new area in combination with the one or more of the search information, the subscription information and the behavior information and the point of interest information in the resident area.

In one embodiment of the present invention, it further comprises: judging whether or not the new area and the resident area are located in the same city; and pushing to the user, if it is judged that they are not located in the same city, one or more information from tourism information and travel navigation information about the city to which the new area belongs.

A second aspect embodiment of the present invention proposes a pushing system based on location information, comprising a server and a client. The server is used for recording a plurality of areas passed by a user, obtaining a resident area of the user according to the frequencies at which the user uses an electronic map in the plurality of areas, and pushing, when it is judged that the user enters a new area from the resident area, point of interest information in the new area to a client used by the user according to the point of interest information about the user in the resident area; and the client is used for receiving the point of interest information in the new area which has been pushed by the server and displaying same to the user.

The pushing system based on location information in the embodiments of the present invention judges a resident area of the user by recording areas passed by the user, and intelligently judges and pushes point of interest information to the user when the user enters a new area. The system may be applied to products such as maps, fully performs personalized customization with user needs as the core, fully exploits the interests of the user, better meets and inspires the needs of the user, changes the passive response mode of the traditional server, has strong interactivity, and is widely applicable and easy to expand.

In one embodiment of the present invention, the server obtains relationship strength information about the user relative to the plurality of areas according to the frequencies at which the user uses the electronic map in the plurality of areas, and selects the resident area of the user from the plurality of areas according to the relationship strength information.

In one embodiment of the present invention, the server calculates the relationship strength information K by means of the following formula:

$$K=SEQ*Sn+\mathrm{Sum}(TYPE*Tx)*Tn/\mathrm{Count}(TYPE),$$

where SEQ represents a reference frequency, Sn represents a first weight value coefficient corresponding to the reference frequency, TYPE represents an operation type when the user uses the electronic map, Tx represents a second weight value coefficient corresponding to the operation type, Sum (TYPE*Tx) represents the sum of the products of all the operation types TYPE and the corresponding second weight value coefficients Tx, Tn represents a third weight value coefficient, and Count(TYPE) represents the total number of the operation types TYPE.

In one embodiment of the present invention, the server is further used for obtaining one or more of search information, subscription information and behavior information about the user, so as to push, to the user, the point of interest information in the new area in combination with the one or more of the search information, the subscription information and the behavior information and the point of interest information in the resident area.

In one embodiment of the present invention, when it is judged that the new area and the resident area are not located in the same city, the server pushes, to the user, one or more information from tourism information and travel navigation information about the city to which the new area belongs.

A third aspect embodiment of the present invention proposes a server, comprising a recording module, a resident area obtaining module and a pushing module, wherein the recording module is used for recording a plurality of area passed by a user; the resident area obtaining module is used for obtaining a resident area of the user according to the frequencies at which the user uses the electronic map in the plurality of areas; and the pushing module is used for pushing, when it is judged that the user enters a new area from the resident area, point of interest information in the new area to the user according to point of interest information about the user in the resident area.

The server in the embodiments of the present invention judges a resident area of the user by recording areas passed by the user, and intelligently judges and pushes point of interest information to the user when the user enters a new area. The server may be applied to products such as maps, fully performs personalized customization with user needs as the core, fully exploits the interests of the user, better meets and inspires the needs of the user, changes the passive response mode of the traditional server, has strong interactivity, and is widely applicable and easy to expand.

In one embodiment of the present invention, the resident area obtaining module obtains relationship strength information about the user relative to the plurality of areas according to the frequencies at which the user uses the electronic map in the plurality of areas, and selects the resident area of the user from the plurality of areas according to the relationship strength information.

In one embodiment of the present invention, the resident area obtaining module calculates the relationship strength information K by means of the following formula:

$$K=SEQ*Sn+\mathrm{Sum}(TYPE*Tx)*Tn/\mathrm{Count}(TYPE),$$

where SEQ represents a reference frequency, Sn represents a first weight value coefficient corresponding to the reference frequency, TYPE represents an operation type when the user uses the electronic map, Tx represents a second weight value coefficient corresponding to the operation type, Sum (TYPE*Tx) represents the sum of the products of all the operation types TYPE and the corresponding second weight value coefficients Tx, Tn represents a third weight value coefficient, and Count(TYPE) represents the total number of the operation types TYPE.

In one embodiment of the present invention, it further comprises: a collection module for obtaining one or more of search information, subscription information and behavior information about the user, so as to push, to the user, the point of interest information in the new area in combination with the one or more of the search information, the subscription information and the behavior information and the point of interest information in the resident area.

In one embodiment of the present invention, when it is judged that the new area and the resident area are not located in the same city, the pushing module pushes, to the user, one or more information from tourism information and travel navigation information about the city to which the new area belongs.

The additional aspects and advantages of the present invention will be provided in part in the description below, and will be apparent in part from the description below, or will be understood by means of putting the present invention into practice.

BRIEF DESCRIPTION OF THE ACCOMPANYING DRAWINGS

The above-mentioned and/or additional aspects and advantages of the present invention will become apparent and be easily understood from the description of the embodiments below in conjunction with the accompanying drawings, in which.

DETAILED DESCRIPTION OF THE PREFERRED EMBODIMENTS

The embodiments of the present invention will be described in detail below, and examples of the embodiments are shown in the accompanying drawings, in which the same or similar reference numerals represent the same or similar elements or elements having the same or similar functions throughout. The embodiments described hereinafter with reference to the accompanying drawings are exemplary and are merely used to explain the present invention, rather than being explained as limitations to the present invention.

With reference to the description hereinafter and the accompanying drawings, these and other aspects of the embodiments of the present invention will become apparent. In the descriptions and accompanying drawings, some particular implementations in the embodiments of the present invention are disclosed specifically in order to show some means of the principles for implementing the embodiments of the present invention; however, it should be understood that the scope of embodiments of the present invention is not limited by same. On the contrary, the embodiments of the present invention include all the changes, modifications and equivalents falling within the scope of the spirit and principles of the appended claims.

Figure 1:
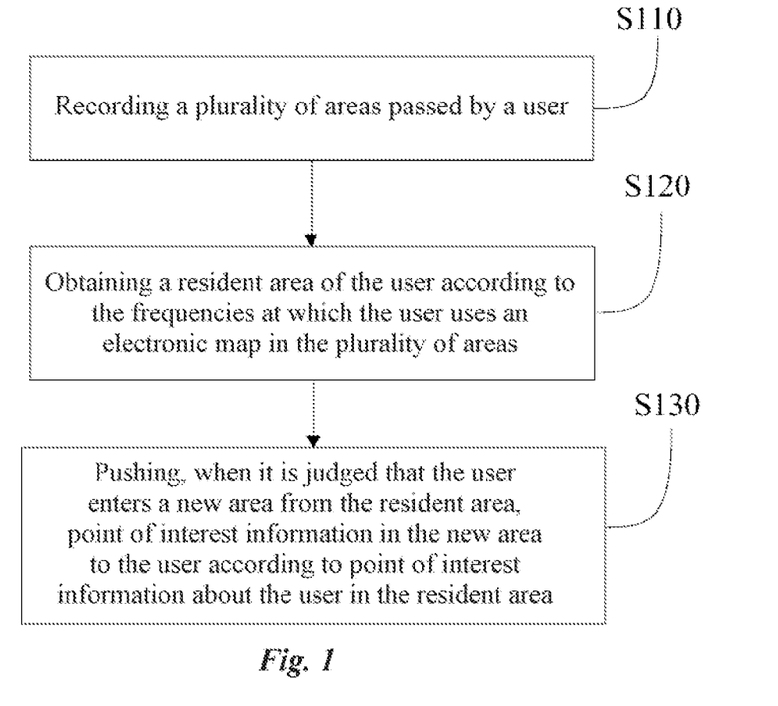
FIG. 1 is a flowchart of a pushing method based on location information according to an embodiment of the present invention.

FIG. 1 is a flowchart of a pushing method based on location information according to an embodiment of the present invention. The pushing method based on location information according to an embodiment of the present invention will be described hereinafter with reference to FIG. 1. As shown in FIG. 1, the pushing method based on location information comprises:

S110: recording a plurality of areas passed by a user.

S120: obtaining a resident area of the user according to the frequencies at which the user uses an electronic map in the plurality of areas.

Obtaining a resident area of the user according to the frequencies at which the user uses an electronic map in the plurality of areas specifically comprises:

S121: obtaining relationship strength information about the user relative to the plurality of areas according to the frequencies at which the user uses the electronic map in the plurality of areas.

S122: selecting the resident area of the user from the plurality of areas according to the relationship strength information.

S130: when it is judged that the user enters a new area from the resident area, pushing point of interest information in the new area to the user according to point of interest information about the user in the resident area.

In one embodiment of the present invention, the relationship strength information K is calculated by means of the following formula:

$$K=SEQ*Sn+Sum(TYPE*Tx)*Tn/Count(TYPE),$$

where SEQ represents a reference frequency, Sn represents a first weight value coefficient corresponding to the reference frequency, TYPE represents an operation type when the user uses the electronic map, Tx represents a second weight value coefficient corresponding to the operation type, Sum(TYPE*Tx) represents the sum of the products of all the operation types TYPE and the corresponding second weight value coefficients Tx, Tn represents a third weight value coefficient, and Count(TYPE) represents the total number of the operation types TYPE.

In one embodiment of the present invention, it further comprises: obtaining one or more information from search information, subscription information and behavior information about the user, so as to push the point of interest information in the new area to the user in combination with the one or more information from the search information, the subscription information and the behavior information and the point of interest information in the resident area.

In one embodiment of the present invention, it further comprises: judging whether the new area and the resident area are located in the same city; and pushing to the user, if it is judged that they are not located in the same city, one or more information from tourism information and travel navigation information about the city to which the new area belongs.

The method of the embodiments of the present invention may be applied to a map application of a mobile terminal, and a server pushes personalized information to the client according to user attributes, settings and/or behavior characteristics. The scenario of the map application of the mobile terminal is taken as an example to describe this method. It can be understood that this application scenario is merely for illustrative purposes, and the embodiments of the present invention is not limited by same.

S210: A server records a plurality of areas passed by a user.

When a user opens and applies a map application or uses the map application to query information, a message sent by the map application to the server may contain information about a city and an area where the user is located at present. The server records this information.

S220: the server obtains a resident area of the user according to the frequencies at which the user uses an electronic map in the plurality of areas. Specifically, S220 comprises:

S221: the server calculates relationship strength information K between the user and the plurality of areas according to the frequencies at which the user uses the electronic map in the plurality of areas, comprising dimensions such as operation times and operation types, the specific formula being as follows:

$$K=SEQ*Sn+Sum(TYPE*Tx)*Tn/Count(TYPE),$$

where SEQ represents a reference frequency, Sn represents a first weight value coefficient corresponding to the reference frequency, TYPE represents an operation type when the user uses the electronic map, Tx represents a second weight value coefficient corresponding to the operation type, Sum(TYPE*Tx) represents the sum of the products of all the operation types TYPE and the corresponding second weight value coefficients Tx, Tn represents a third weight value coefficient, and Count(TYPE) represents the total number of the operation types TYPE. SEQ specifies the occurrence frequency/reference frequency index in a cycle, and since use habits of the user in different types of cities or areas are different, the reference frequency can be configured according to different cities.

S222: the server selects the resident area of the user from the plurality of areas according to the relationship strength information K. Specifically, the server automatically analyzes and judges whether the user is in the resident city and resident area according to the relationship strength information K. It may be represented, for example, in the following form:

UserArea=List of areas in which the user has appeared [Max(K)]; and

UserCity=Area.city;

where the UserArea is the resident area of the user, and is assigned to be an area where the relationship strength information K is the maximum in the list of areas in which the user has appeared. The UserCit is the resident city of the user, and is assigned to be a city where the area is located.

In addition, the map application may send deductions of the resident city and the resident area to the user, and guides the user to confirm the resident city and area, and sets the information confirmed by the user with a higher relationship coefficient, e.g. K=1.

S230: when it is judged that the user enters a new area from the resident area, the server pushes point of interest information in the new area to the user according to point of interest information about the user in the resident area.

The point of interest information about the user in the new area is generated by combining information about the resident area of the user and the characteristics of the new area, and is content that the user may be interested in in the new area judged by the server. For example, if it is judged that the new area and the resident area are not in the same city, the server pushes, to the user, one or more information from tourism information and travel navigation information about the city to which the new area belongs.

The server pushing point of interest information in the new area to the user specifically comprises:

S231: the server judges whether the user has entered a new area according to the real-time location and a historical track of the user.

S232: if the user has entered a new area, the server regulates an interest weight value according to a time window and an area of interest which are set by the user.

S233: the server carries out comprehensive calculation according to factors such as an attribute of the new area, a user distance and the interest weight value, and the calculation results are aggregated and recommended to the user.

For example, when the server determines that the user moves from the resident city and/or the resident area thereof to a new area and/or city, the server makes a pushing decision and decides whether to push point of interest information about the user within the resident area to the user. The specific decision comprises:

(I) the user enters a new area, i.e. the area is neither in the resident area nor a recent historical track. If it is in the same city as the resident area, nearby consumption information including group purchases, discounts, etc. are aggregated. If it is not in the same city as the resident area, tourism information, travel navigation information, etc. about the city are aggregated.

(II) If the user enters the resident area, nearby newly added life information are aggregated.

(III) If the user enters a non-resident area which has appeared in the recent historical track, pushing is not performed in order to avoid producing information interference.

In addition, if the user has set a time window for turning the pushing on and off, the recommendation is only carried out within the time window for turning on and off. If the user has set the resident area and an area of interest in advance, the interest weight value of the content excluding these areas is reduced and the content is not pushed.

Furthermore, the types of contents which need to be aggregated are determined according to the pushing decision of the server. The content per se has attributes such as location and/or category, and the content is screened according to the interest weight value and/or a distance weight value. The content that the user may be interested in can be judged according to user behaviors, for example, the categories and/or query frequencies of query terms of the user are ranked, so as to obtain a top-ranked category, for example, it may be represented as the interest weight value Iu=Seq(query_words_category), the interest weight value Iu is set as the top n values in the ranking of the query term category (query_words_category) of the user, where n is a pre-set number. The content that the user may be interested in may also be determined by user subscription settings, for example, the interest weight value of the subscription content that is set by the user as being of interest in is set as 1, for example, Iu=1. The interest weight value is regulated in combination with the attribute of the information content per se. The information content per se has a certain interest value cardinal number for marking information that the user wishes to comprehend. For example, the interest value cardinal number may be represented as I, the calculation formula is I=CONTENT*Cn+Iu*In, where CONTENT is content information, Cn and In are respectively a content attribute weight value proportion and an interest weight value proportion, and Iu is the interest weight value. The interest decision finally obtains the top n places of the ranking of the content interest weight value and the distance weight value of the user: List(content)=Top(Sort (I)*Distance(Content)), where sort (I) represents the ranking of the interest weight value of the content, Distance(Content) represents the distance weight value, and TOP represents obtaining the top n places.

S240: when the information reaches a client program, the client identifies and parses the information, and carries out corresponding presentation and user guiding, such as special offers, traffic avoidance reminder, etc.

According to the pushing method based on location information in the embodiments of the present invention, the server intelligently judges the resident area, the new area and the content which may be interested by the user according to factors such as the location, track, user settings, query, etc. of the client, and recommends to the user. The method of this embodiment takes the location of the user as the core factor, intelligently recommends personalized peripheral information, enhances the interaction characteristics of the product, changes the service mode of the client passively responding to a user request, actively analyzes the user scenario, and carries out information pushing according to the behavior characteristics of the user, can better meet the needs of the user and inspire the potential needs of the user, and is widely applicable and easy to expand.

In order to implement the above-mentioned embodiment, the embodiments of the present invention also propose a pushing system based on location information.

Figure 2:
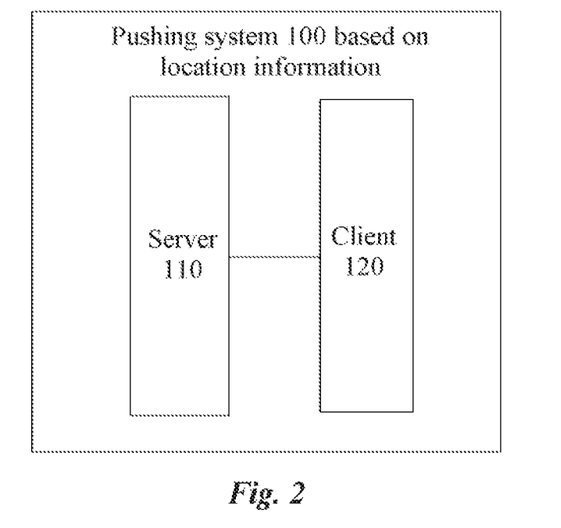
FIG. 2 is a structural schematic diagram of a pushing system based on location information according to an embodiment of the present invention.

FIG. 2 is a structural schematic diagram of a pushing system based on location information according to an embodiment of the present invention, and the pushing system based on location information according to the embodiments of the present invention will be described hereinafter with reference to FIG. 2. As shown in FIG. 2, a pushing system 100 based on location information comprises a server 110 and a client 120.

The server 110 is used for recording a plurality of areas passed by a user, obtaining a resident area of the user according to the frequencies at which the user uses an electronic map in the plurality of areas, and pushing, when it is judged that the user enters a new area from the resident area, point of interest information in the new area to a client 120 used by the user according to the point of interest information about the user in the resident area; and the client 120 is used for receiving the point of interest information in the new area which has been pushed by the server 110 and displaying same to the user.

The server 110 obtains relationship strength information about the user relative to the plurality of areas according to the frequencies at which the user uses the electronic map in the plurality of areas, and selects the resident area of the user from the plurality of areas according to the relationship strength information.

In one embodiment of the present invention, the server 110 is further used for obtaining one or more information from search information, subscription information and behavior information about the user, so as to push the point of interest information in the new area to the user in combination with the one or more information from the search information, the subscription information and the behavior information and the point of interest information in the resident area.

In one embodiment of the present invention, when it is judged that the new area and the resident area are not in the same city, the server 110 pushes, to the user, one or more information from tourism information and travel navigation information about the city to which the new area belongs.

The system of the embodiments of the present invention may be applied to a map application of a mobile terminal, and the server 110 pushes personalized information to the client 120 according to user attributes, settings and behavior characteristics. The scenario of the map application of the mobile terminal is taken as an example to describe this system. It can be understood that this application scenario is merely for illustrative purposes, and the embodiments of the present invention are not limited by same.

S310: a server 110 records a plurality of areas passed by a user.

When a user opens a client 120 application or uses the client 120 to query information, a message sent by the client 120 to the server 110 may contain information about a city and an area where the user is located at present. The server 110 records the information.

S320: the server 110 obtains a resident area of the user according to the frequencies at which the user uses an electronic map in the plurality of areas. Specifically, S320 comprises:

S321: the server 110 calculates relationship strength information K between the user and the plurality of areas according to the frequencies at which the user uses the electronic map in the plurality of areas, comprising dimensions such as operation times and operation types, the specific formula being as follows:

$$K=\text{SEQ}*Sn+\text{Sum}(\text{TYPE}*Tx)*Tn/\text{Count}(\text{TYPE}).$$

where SEQ represents a reference frequency, Sn represents a first weight value coefficient corresponding to the reference frequency, TYPE represents an operation type when the user uses the electronic map, Tx represents a second weight value coefficient corresponding to the operation type, Sum (TYPE*Tx) represents the sum of the products of all the operation types TYPE and the corresponding second weight value coefficients Tx, Tn represents a third weight value coefficient, and Count(TYPE) represents the total number of the operation types TYPE. SEQ specifies the occurrence frequency/reference frequency index in a cycle, and since use habits of the user in different types of cities or areas are different, the reference frequency can be configured according to different cities.

S322: the server 110 selects the resident area of the user from the plurality of areas according to the relationship strength information K. Specifically, the server 110 automatically analyzes and judges whether the user is in the resident city and resident area according to the relationship strength information K. It may be represented, e.g. in the following form:

UserArea=list of areas in which the user has appeared [Max(K)];

UserCity=Area.city;

where the UserArea is the resident area of the user, and is assigned to be an area where the relationship strength information K is the maximum in the list of areas in which the user has appeared. The UserCit is the resident city of the user, and is assigned to be a city where the area is located.

In addition, the map application may send deductions of the resident city and the resident area to the user, and guides the user to confirm the resident city and area, and sets the information confirmed by the user with a higher relationship coefficient, e.g. K=1.

S330: when it is judged that the user enters a new area from the resident area, the server 110 pushes point of interest information in the new area to the user according to point of interest information about the user in the resident area.

The point of interest information about the user in the new area is generated by combining information about the resident area of the user and the characteristics of the new area, and is content that the user may be interested in in the new area judged by the server 110. For example, if it is judged that the new area and the resident area are not in the same city, the server 110 pushes, to the user, one or more information from tourism information and travel navigation information about the city to which the new area belongs.

The server 110 pushing point of interest information in the new area to the user specifically comprises:

S331: the server 110 judges whether the user has entered a new area according to the real-time location and a historical track of the user.

S332: if the user has entered a new area, the server 110 regulates an interest weight value according to a time window and an area of interest which are set by the user.

S333: the server 110 carries out comprehensive calculation according to factors such as an attribute of the new area, a user distance and the interest weight value, and the calculation results are aggregated and recommended to the user.

For example, when the server 110 determines that the user moves from the resident city and/or the resident area thereof to a new area and/or city, the server 110 makes a pushing decision and decides whether to push point of interest information about the user within the resident area to the user. The specific decision comprises:

(I) the user enters a new area, i.e. the area is neither in the resident area nor a recent historical track. If it is in the same city as the resident area, nearby consumption information including group purchases, discounts, etc. are aggregated. If it is not in the same city as the resident area, tourism information, travel navigation information, etc. about the city are aggregated.

(II) If the user enters the resident area, nearby newly added life information are aggregated.

(III) If the user enters a non-resident area which has appeared in the recent historical track, pushing is not performed in order to avoid producing information interference.

In addition, if the user has set a time window for turning the pushing on and off, the recommendation is only carried out within the time window for turning on and off. If the user has set the resident area and an area of interest in advance, the interest weight value of the content excluding these areas is reduced and the content is not pushed.

Furthermore, the types of contents which need to be aggregated are determined according to the pushing decision of the server 110. The content per se has attributes such as location and/or category, and the content is screened according to the interest weight value and/or a distance weight value. The content that the user may be interested in can be judged according to user behaviors, for example, the categories and/or query frequencies of query terms of the user are ranked, so as to obtain a top-ranked category, for example, it may be represented as the interest weight value Iu=Seq(query_words_category), the interest weight value Iu is set as the top n values in the ranking of the query term category (query_words_category) of the user, where n is a pre-set number. The content that the user may be interested in may also be determined by user subscription settings, for example, the interest weight value of the subscription content that is set by the user which is of interest is set as 1, for example, Iu=1. The interest weight value is regulated in combination with the attribute of the information content per se. The information content per se has a certain interest value cardinal number for marking information that the user wishes to comprehend. For example, the interest value cardinal number may be represented as I, the calculation formula is I=CONTENT*Cn+Iu*In, where CONTENT is content information, Cn and In are respectively a content attribute weight value proportion and an interest weight value proportion, and Iu is the interest weight value. The interest decision finally obtains the top n places of the ranking of the content interest weight value and the distance weight value of the user: List(content)=Top(Sort(I)*Distance (Content)), where sort (I) represents the ranking of the interest weight value of the content, Distance(Content) represents the distance weight value, and TOP represents obtaining the top n places.

S340: when the information reaches the client 120, the client 120 identifies and parses the information, and carries out corresponding presentation and user guiding, such as special offers, traffic avoidance reminder, etc.

According to the pushing system based on location information in the embodiments of the present invention, the server intelligently judges the resident area, the new area and the content which may be interested by the user according to factors such as the location, track, user settings, query, etc. of the client, and recommends to the user. The system of this embodiment takes the location of the user as the core factor, intelligently recommends personalized peripheral information, enhances the interaction characteristics of the product, changes the service mode of the client passively responding to a user request, actively analyzes the user scenario, and carries out information pushing according to the behavior characteristics of the user, can better meet the needs of the user and inspire the potential needs of the user, and is widely applicable and easy to expand.

In order to implement the above-mentioned embodiment, the embodiments of the present invention further propose a server.

Figure 3:
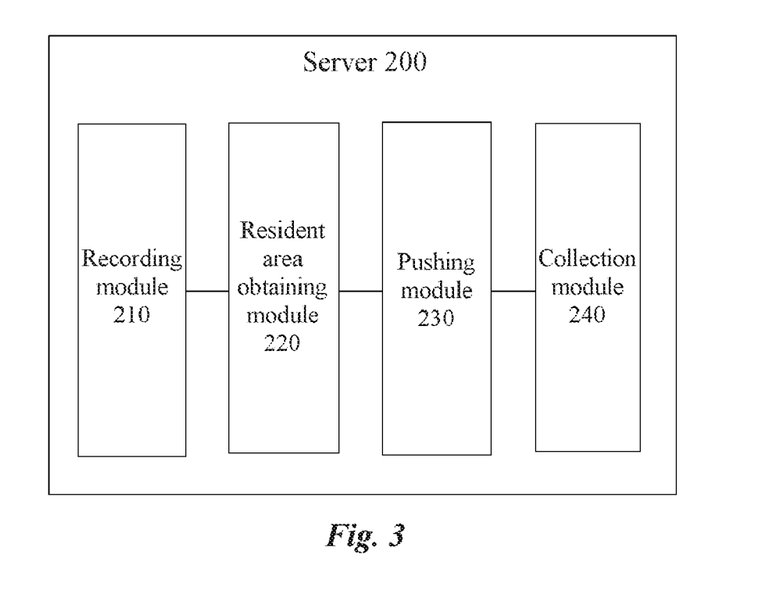
FIG. 3 is a structural schematic diagram of a server according to an embodiment of the present invention.

FIG. 3 is a structural schematic diagram of a server according to an embodiment of the present invention, and the server according to the embodiments of the present invention will be described hereinafter with reference to FIG. 3. As shown in FIG. 3, the server 200 comprises a recording module 210, a resident area obtaining module 220, a pushing module 230 and a collection module 240.

The recording module 210 is used for recording a plurality of areas passed by a user; the resident area obtaining module 220 is used for obtaining a resident area of the user according to the frequencies at which the user uses an electronic map in the plurality of areas; and the pushing module 230 is used for pushing, when it is judged that the user enters a new area from the resident area, point of interest information in the new area to the user according to the point of interest information about the user in the resident area.

The collection module 240 is used for obtaining one or more information from search information, subscription information and behavior information about the user, so as to push the point of interest information in the new area to the user in combination with the one or more information from the search information, the subscription information and the behavior information and the point of interest information in the resident area.

In one embodiment of the present invention, the resident area obtaining module 220 obtains relationship strength information about the user relative to the plurality of areas according to the frequencies at which the user uses the electronic map in the plurality of areas, and selects the resident area of the user from the plurality of areas according to the relationship strength information.

In one embodiment of the present invention, when it is judged that the new area and the resident area are not in the same city, the pushing module 230 pushes, to the user, one or more information from tourism information and travel navigation information about the city to which the new area belongs.

The server of the embodiments of the present invention may be applied to a map application of a mobile terminal, and a server pushes personalized information to the client according to user attributes, settings and behavior characteristics. The scenario of the map application of the mobile terminal is taken as an example to describe this method. It can be understood that this application scenario is merely for illustrative purposes, and the embodiments of the present invention are not limited by same.

S410: the recording module 210 records a plurality of areas passed by a user.

When a user opens and applies a map application or uses the map application to query information, a message sent by the map application to the server may contain information about a city and an area where the user is located at present. The recording module 210 records the information.

S420: the resident area obtaining module 220 obtains a resident area of the user according to the frequencies at which the user uses an electronic map in the plurality of areas. It specifically comprises:

S421: the resident area obtaining module 220 calculates relationship strength information K between the user and the plurality of areas according to the frequencies at which the user uses the electronic map in the plurality of areas, comprising dimensions such as operation times and operation types, the specific formula being as follows:

$$K=SEQ*Sn+\text{Sum}(TYPE*Tx)*Tn/\text{Count}(TYPE),$$

where SEQ represents a reference frequency, Sn represents a first weight value coefficient corresponding to the reference frequency, TYPE represents an operation type when the user uses the electronic map, Tx represents a second weight value coefficient corresponding to the operation type, Sum (TYPE*Tx) represents the sum of the products of all the operation types TYPE and the corresponding second weight value coefficients Tx, Tn represents a third weight value coefficient, and Count(TYPE) represents the total number of the operation types TYPE. SEQ specifies the occurrence frequency/reference frequency index in a cycle, and since use habits of the user in different types of cities or areas are different, the reference frequency can be configured according to different cities.

S422: the resident area obtaining module 220 selects the resident area of the user from the plurality of areas according to the relationship strength information K. Specifically, the resident area obtaining module 220 automatically analyzes and judges whether the user is in the resident city and resident area according to the relationship strength information K. It may be represented, e.g. in the following form:

UserArea=list of areas in which the user has appeared [Max(K)];

UserCity=Area.city;

where the UserArea is the resident area of the user, and is assigned to be an area where the relationship strength information K is the maximum in the list of areas in which the user has appeared. The UserCit is the resident city of the user, and is assigned to be a city where the area is located.

In addition, application software App may send deductions of the resident city and the resident area to the user, and guides the user to confirm the resident city and area, and sets the information confirmed by the user with a higher relationship coefficient, e.g. K=1.

S430: when the pushing module 230 judges that the user enters a new area from the resident area, the pushing module 230 pushes point of interest information in the new area to the user according to point of interest information about the user in the resident area.

The point of interest information about the user in the new area is generated by combining information about the resident area of the user and the characteristics of the new area, and is content that the user may be interested in in the new area judged by the server. For example, if the pushing module 230 judges that the new area and the resident area are not in the same city, the pushing module 230 pushes, to the user, one or more information from tourism information and travel navigation information about the city to which the new area belongs.

The pushing module 230 pushing point of interest information in the new area to the user specifically comprises:

S431: the pushing module 230 judges whether the user has entered a new area according to the real-time location and a historical track of the user.

S432: if the user has entered a new area, the pushing module 230 regulates an interest weight value according to a time window and an area of interest which are set by the user.

S433: the pushing module 230 carries out comprehensive calculation according to factors such as an attribute of the new area, a user distance and the interest weight value, and the calculation results are aggregated and recommended to the user.

For example, when the pushing module 230 determines that the user moves from the resident city and/or the resident area thereof to a new area and/or city, the pushing module 230 makes a pushing decision and decides whether to push point of interest information about the user within the resident area to the user. The specific decision comprises:

(I) the user enters a new area, i.e. the area is neither in the resident area nor a recent historical track. If it is in the same city as the resident area, nearby consumption information including group purchases, discounts, etc. are aggregated. If it is not in the same city as the resident area, tourism information, travel navigation information, etc. about the city are aggregated.

(II) If the user enters the resident area, nearby newly added life information are aggregated.

(III) If the user enters a non-resident area which has appeared in the recent historical track, pushing is not performed in order to avoid producing information interference.

In addition, if the user has set a time window for turning the pushing on and off, the recommendation is only carried out within the time window for turning on and off. If the user has set the resident area and an area of interest in advance, the interest weight value of the content excluding these areas is reduced and the content is not pushed.

Furthermore, the types of the contents which need to be aggregated are determined according to the pushing decision of the pushing module 230. The content per se has attributes such as location and/or category, and the content is screened according to the interest weight value and/or a distance weight value. The content that the user may be interested in can be judged according to user behaviors, for example, the categories and/or query frequencies of query terms of the user are ranked, so as to obtain a top-ranked category, for example, it may be represented as the interest weight value Iu=Seq (query_words_category), the interest weight value Iu is set as the top n values in the ranking of the query term category (query_words_category) of the user, where n is a pre-set number. The content that the user may be interested in may also be determined by user subscription settings, for example, the interest weight value of the subscription content that is set by the user to be of interest is set as 1, for example, Iu=1. The interest weight value is regulated in combination with the attribute of the information content per se. The information content per se has a certain interest value cardinal number for marking information that the user wishes to comprehend. For example, the interest value cardinal number may be represented as I, the calculation formula is I=CONTENT*Cn+Iu*In, where CONTENT is content information, Cn and In are respectively a content attribute weight value proportion and an interest weight value proportion, and Iu is the interest weight value. The interest decision finally obtains the top n places of the ranking of the content interest weight value and the distance weight value of the user: List(content)=Top(Sort (I)*Distance(Content)), where sort (I) represents the ranking of the interest weight value of the content, Distance(Content) represents the distance weight value, and TOP represents obtaining the top n places.

The server according to the embodiments of the present invention intelligently judges the resident area, the new area and the content which may be of interest of the user according to factors such as the location, track, user settings, query, etc. of the client, and recommends same to the user. The method of the embodiments of the present invention takes the location of the user as the core factor, intelligently recommends personalized peripheral information, enhances the interaction characteristics of the product, changes the service mode of the client passively responding to a user request, actively analyzes the user scenario, and carries out information pushing according to the behavior characteristics of the user, can better meet the needs of the user and inspire the potential needs of the user, and is widely applicable and easy to expand.

Aspects of various embodiments are specified in the claims. Those and other aspects of various embodiments and specified in the following numbered clauses:

1. A pushing method based on location information, characterized in that it comprises:

recording a plurality of areas passed by a user;

obtaining a resident area of said user according to the frequencies at which the user uses an electronic map in the plurality of areas; and pushing, when it is judged that said user enters a new area from the resident area, point of interest information in said new area to said user according to point of interest information about said user in said resident area.

2. The pushing method based on location information as claimed in clause 1, characterized in that said obtaining a resident area of said user according to the frequencies at which the user uses an electronic map in the plurality of areas specifically comprises:

obtaining relationship strength information about said user relative to said plurality of areas according to the frequencies at which said user uses the electronic map in the plurality of areas; and selecting the resident area of said user from said plurality of areas according to said relationship strength information.

3. The pushing method based on location information as claimed in clause 2, characterized in that said relationship strength information K is calculated by means of the following formula:

$$K=SEQ*Sn+\text{Sum}(TYPE*Tx)*Tn/\text{Count}(TYPE),$$

where SEQ represents a reference frequency, Sn represents a first weight value coefficient corresponding to said reference frequency, TYPE represents an operation type when said user uses the electronic map, Tx represents a second weight value coefficient corresponding to said operation type, Sum (TYPE*Tx) represents the sum of all the products of the operation types TYPE times the corresponding second weight value coefficients Tx, Tn represents a third weight value coefficient, and Count(TYPE) represents the total number of said operation types TYPE.

4. The pushing method based on location information as claimed in any one of clauses 1-3, characterized in that it further comprises:
obtaining one or more of search information, subscription information and behavior information about said user; and
pushing, to said user, the point of interest information in said new area in combination with said one or more information from the search information, the subscription information and the behavior information and said point of interest information in the resident area.

5. The pushing method based on location information as claimed in any one of clauses 1-4, characterized in that it further comprises:
judging whether or not said new area and said resident area are located in the same city; and
pushing to said user, if it is judged that they are not located in the same city, one or more information from tourism information and travel navigation information about the city to which said new area belongs.

6. A server, characterized by comprising:
a recording module for recording a plurality of areas passed by a user;
a resident area obtaining module for obtaining a resident area of said user according to the frequencies at which the user uses an electronic map in the plurality of areas; and
a pushing module for pushing, when it is judged that said user enters a new area from the resident area, point of interest information in said new area to said user according to point of interest information about said user in said resident area.

7. The server as claimed in clause 6, characterized in that said resident area obtaining module obtains relationship strength information about said user relative to said plurality of areas according to the frequencies at which said user uses the electronic map in the plurality of areas, and selects the resident area of said user from said plurality of areas according to said relationship strength information.

8. The server as claimed in clause 7, characterized in that said resident area obtaining module calculates said relationship strength information K by means of the following formula:

$$K=SEQ*Sn+Sum(TYPE*Tx)*Tn/Count(TYPE),$$

where SEQ represents a reference frequency, Sn represents a first weight value coefficient corresponding to said reference frequency, TYPE represents an operation type when said user uses the electronic map, Tx represents a second weight value coefficient corresponding to said operation type, Sum (TYPE*Tx) represents the sum of all the products of the operation types TYPE times the corresponding second weight value coefficients Tx, Tn represents a third weight value coefficient, and Count(TYPE) represents the total number of said operation types TYPE.

9. The server as claimed in any one of clauses 6-8, characterized by further comprising:
a collection module for obtaining one or more of search information, subscription information and behavior information about said user, so as to push, to said user, the point of interest information in said new area in combination with said one or more information from the search information, the subscription information and the behavior information and said point of interest information in the resident area.

10. The server as claimed in any one of clauses 6-9, characterized in that, when it is judged that said new area and said resident area are not located in the same city, said pushing module pushes, to said user, one or more information from tourism information and travel navigation information about the city to which said new area belongs.

11. A pushing system based on location information, characterized by comprising a server and a client, wherein,
said server is used for recording a plurality of areas passed by a user, obtaining a resident area of said user according to the frequencies at which the user uses an electronic map in the plurality of areas, and pushing, when it is judged that said user enters a new area from the resident area, point of interest information in said new area to a client used by said user according to the point of interest information about said user in said resident area; and
said client is used for receiving the point of interest information in said new area which has been pushed by said server and displaying same to said user.

12. The pushing system based on location information as claimed in clause 11, characterized in that said server obtains relationship strength information about said user relative to said plurality of areas according to the frequencies at which said user uses the electronic map in the plurality of areas, and selects the resident area of said user from said plurality of areas according to said relationship strength information.

13. The pushing system based on location information as claimed in clause 12, characterized in that said server calculates said relationship strength information K by means of the following formula:

$$K=SEQ*Sn+Sum(TYPE*Tx)*Tn/Count(TYPE),$$

where SEQ represents a reference frequency, Sn represents a first weight value coefficient corresponding to said reference frequency, TYPE represents an operation type when said user uses the electronic map, Tx represents a second weight value coefficient corresponding to said operation type, Sum (TYPE*Tx) represents the sum of all the products of the operation types TYPE times the corresponding second weight value coefficients Tx, Tn represents a third weight value coefficient, and Count(TYPE) represents the total number of said operation types TYPE.

14. The pushing system based on location information as claimed in any one of clauses 11-13, characterized in that said server is further used for obtaining one or more of search information, subscription information and behavior information about said user, so as to push, to said user, the point of interest information in said new area in combination with said one or more information from the search information, the subscription information and the behavior information and the point of interest information in said resident area.

15. The pushing system based on location information as claimed in any one of clauses 11-14, characterized in that, when it is judged that said new area and said resident area are not located in the same city, said server pushes, to said user, one or more information from tourism information and travel navigation information about the city to which said new area belongs.

In the description of the specification, the description of the reference terms such as "one embodiment", "some embodiments", "an example", "a specific example" or "some examples" is intended to mean that a particular feature, structure, material or characteristic described in connection with the embodiment or example is included in at least one embodiment or example of the present invention. In the present description, the illustrative expression of the above-mentioned terms does not necessarily refer to the same embodiment or example. Furthermore, the described particular feature, structure, material or characteristic may be combined in a suitable manner with any one or more embodiments or examples.

Although the embodiments of the present invention have been shown and described, it should be understood by those of ordinary skill in the art that various changes, modifications, replacements and variations can be made to these embodiments without departing from the principle and spirit of the present invention, and the scope of the present invention is defined by the appended claims and the equivalents thereof.

What is claimed is:

1. A pushing method based on location information, comprising:
    by calculating a weighted frequency at which the selected user uses an electronic map in the plurality of areas and an averaged operation type by which the selected user uses the electronic map in the plurality of areas;
    selecting a resident area of the selected user from the plurality of areas according to a relationship strength information;
    determining whether the selected user has entered a new area; and
    pushing point of interest information in the new area to the selected user according to said determining and point of interest information about the selected user in the resident area,
    wherein the point of interest information refers to the information that is determined by recorded information or user setting information.

2. The pushing method of claim 1, wherein said obtaining the relationship strength information includes calculating the relationship strength information K via a formula: $K=SEQ*Sn+Sum(TYPE*Tx)*Tn/Count(TYPE)$,
    wherein SEQ represents a reference frequency, Sn represents a first weight value coefficient corresponding to the reference frequency, TYPE represents an operation type when the selected user uses the electronic map, Tx represents a second weight value coefficient corresponding to the operation type, Sum(TYPE * Tx) represents the sum of all the products of the operation types TYPE times the corresponding second weight value coefficients Tx, Tn represents a third weight value coefficient, and Count(TYPE) represents a total number of the operation types TYPE.

3. The pushing method of claim 1, further comprising:
    obtaining selected information about the selected user; and
    pushing, to the selected user, the point of interest information in the new area in combination with the selected information and the point of interest information in the resident area.

4. The pushing method of claim 3, wherein the selected information includes at least one of search information, subscription information and behavior information about the selected user.

5. The pushing method of claim 1, further comprising:
    determining whether a first geographical region associated with the new area is different from a second geographical region associated with the resident area; and
    pushing to the selected user at least one of tourism information and travel navigation information about a geographical region to which the new area belongs based upon said determining.

6. The pushing method of claim 5, wherein the first and second geographical regions are cities.

7. A non-transitory computer storage medium including at least one program for execution by a processor, comprising:
    recording a plurality of areas passed by a selected user;
    obtaining relationship strength information about the selected user relative to the plurality of areas by calculating a weighted frequency at which the selected user uses an electronic map in the plurality of areas and an averaged operation type by which the selected user uses the electronic map in the plurality of areas;
    selecting a resident area of the selected user from the plurality of areas according to the relationship strength information;
    determining whether the selected user has entered a new area; and
    pushing point of interest information in the new area to the selected user according to point of interest information about the selected user in the resident area when the selected user has entered the new area,
    wherein the point of interest information refers to the information that is determined by recorded information or user setting information.

8. The non-transitory computer storage medium of claim 7, wherein said obtaining comprises calculating the relationship strength information as relationship strength information K via a formula: $K=SEQ*Sn+Sum(TYPE*Tx)*Tn/Count(TYPE)$,
    wherein SEQ represents a reference frequency, Sn represents a first weight value coefficient corresponding to the reference frequency, TYPE represents an operation type when the selected user uses the electronic map, Tx represents a second weight value coefficient corresponding to the operation type, Sum(TYPE * Tx) represents the sum of all the products of the operation types TYPE times the corresponding second weight value coefficients Tx, Tn represents a third weight value coefficient, and Count(TYPE) represents a total number of the operation types TYPE.

9. The non-transitory computer storage medium of claim 7, further comprising obtaining selected information about the selected user and pushing, to the selected user, the point of interest information in the new area in combination with the selected information and the point of interest information in the resident area.

10. The non-transitory computer storage medium of claim 9, wherein the selected information includes at least one of search information, subscription information and behavior information about the selected user.

11. The non-transitory computer storage medium of claim 7, wherein said determining comprises generating a determination that the selected user has entered the new area and pushes to the selected user at least one of tourism information and travel navigation information about a geographical region to which the new area belongs based upon the determination.

12. The non-transitory computer storage medium of claim 11, wherein the first and second geographical regions are cities.

13. A pushing system based on location information, comprising:
    a server configured to:
        record a plurality of areas passed by a selected user;
        obtain relationship strength information about the selected user relative to the plurality of areas by calculating a weighted frequency at which the selected user uses an electronic map in the plurality of areas and an averaged operation type by which the selected user uses the electronic map in the plurality of areas;

select a resident area of the selected user from the plurality of areas according to the relationship strength information;
determine whether the selected user has entered a new area; and
push point of interest information in the new area to the selected user according to point of interest information about the selected user in the resident area when the selected user has entered the new area; and a mobile terminal configured to receive and present the point of interest information in the new area pushed by said server, wherein the point of interest information refers to the information that is determined by recorded information or user setting information.

14. The pushing system of claim 13, wherein said server obtains selected information about the selected user and pushes, to the selected user, the point of interest information in the new area in combination with the selected information and the point of interest information in the resident area.

15. The pushing system of claim 14, wherein the selected information includes at least one of search information, subscription information and behavior information about the selected user.

16. The pushing system of claim 13, wherein said server generates a determination that the selected user has entered the new area and pushes to the selected user at least one of tourism information and travel navigation information about a geographical region to which the new area belongs based upon the determination.

17. The pushing system of claim 16, wherein the first and second geographical regions are cities.

* * * * *